(12) United States Patent
Nigam

(10) Patent No.: US 10,120,949 B2
(45) Date of Patent: Nov. 6, 2018

(54) INDEXING NATIVE APPLICATION DATA

(71) Applicant: Google LLC, Mountain View, CA (US)

(72) Inventor: Piyush Nigam, Hyderbad (IN)

(73) Assignee: Google LLC, Mountain View, CA (US)

( * ) Notice: Subject to any disclaimer, the term of this patent is extended or adjusted under 35 U.S.C. 154(b) by 281 days.

(21) Appl. No.: 14/926,253

(22) Filed: Oct. 29, 2015

(65) Prior Publication Data

US 2017/0124101 A1 May 4, 2017

(51) Int. Cl.
*G06F 17/30* (2006.01)

(52) U.S. Cl.
CPC .... *G06F 17/3087* (2013.01); *G06F 17/30867* (2013.01)

(58) Field of Classification Search
CPC ......... G06F 17/30864; G06F 17/30321; G06F 17/30867; G06F 17/30336; G06F 17/30424; G06F 17/30554; G06F 17/30011
USPC ... 707/711, 707, 709, 741, 999.003, 999.009
See application file for complete search history.

(56) References Cited

U.S. PATENT DOCUMENTS

| | | | | |
|---|---|---|---|---|
| 7,516,492 B1* | 4/2009 | Nisbet | ................... | G06F 21/554 707/999.001 |
| 9,069,436 B1* | 6/2015 | Fieweger | ............... | G06F 3/0481 |
| 9,691,051 B2* | 6/2017 | Rexer | ..................... | G06Q 10/10 |
| 2004/0267730 A1 | 12/2004 | Dumais et al. | | |
| 2005/0234891 A1 | 10/2005 | Walther et al. | | |
| 2007/0174237 A1* | 7/2007 | Wilbrink | ........... | G06F 17/30902 |
| 2010/0169337 A1* | 7/2010 | Green | ............... | G06F 17/30719 707/758 |
| 2012/0158846 A1* | 6/2012 | Linder | .................... | H04L 51/32 709/204 |
| 2013/0262385 A1* | 10/2013 | Kumarasamy | .... | G06F 17/30581 707/634 |
| 2014/0129457 A1* | 5/2014 | Peeler | .................. | G06Q 10/067 705/317 |
| 2014/0358887 A1 | 12/2014 | Morris et al. | | |
| 2014/0365462 A1 | 12/2014 | Chang | | |
| 2015/0026153 A1* | 1/2015 | Gupta | ............... | G06F 17/30336 707/711 |

(Continued)

FOREIGN PATENT DOCUMENTS

EP    2846273    3/2015

OTHER PUBLICATIONS

International Search Report and Written Opinion in Application No. PCT/USD2016/053458, dated Dec. 2, 2016, 10 pages.

*Primary Examiner* — Dung K Chau

(74) *Attorney, Agent, or Firm* — Fish & Richardson P.C.

(57) ABSTRACT

Methods, including computer programs encoded on a computer storage medium, for indexing native application data. In one aspect, a method includes: receiving, by a search engine and from a mobile device, a set of data that is generated by a native application on the mobile device, the set of data including (i) data that identifies the native application, (ii) a representation of viewed content, (iii) a link to the viewed content that, when selected, launches the viewed content in the native application; storing, by the search engine, (i) the data that identifies the native application, and (ii) the link to the viewed content in association with the viewed content; and using the stored set of data in generating a search result that (i) references the viewed content, and (ii) includes the link to the viewed content that, when selected, launches the viewed content in the native application.

8 Claims, 3 Drawing Sheets

(56) References Cited

U.S. PATENT DOCUMENTS

| | | |
|---|---|---|
| 2015/0066886 A1 | 3/2015 | Wu et al. |
| 2015/0161149 A1* | 6/2015 | Genera ............... G06F 17/3087 707/711 |
| 2015/0379128 A1* | 12/2015 | Chang ............... G06F 17/30864 707/711 |
| 2016/0132194 A1* | 5/2016 | Grue .................... G06F 3/0482 715/810 |
| 2016/0179955 A1* | 6/2016 | Delli Santi ....... G06F 17/30864 707/709 |

* cited by examiner

INDEXING NATIVE APPLICATION DATA

FIELD

The present specification relates to search engines.

BACKGROUND

Digital content available over the Internet is often consumed by users on mobile devices. For example, mobile devices include native applications that provide users with access to digital content. The consumption of digital content is one type of user behavior that can be used to improve the accuracy of search results provided to users.

SUMMARY

In general, one innovative aspect of the subject matter described in this specification can be embodied in methods that make native application content that is accessed by a user available to a search engine. For example, in response to receiving a search query that is related to the viewed content, the search engine may generate search results that include references to the viewed content. In particular, the search engine may access a set of data associated with the native application content within an index, and in response to receiving the search query, the search engine may use the stored set of data to generate a search results page that references the viewed content, and provides a link to the viewed content that, when enabled, launches the native application.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the viewed content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

Implementations may include one or more of the following features. For example, receiving, by a search engine and from a mobile device, a set of data that is generated by a native application on the mobile device, the set of data including (i) data that identifies the native application, (ii) a representation of viewed content, and (iii) a link to the viewed content that, when selected, launches the viewed content in the native application; storing, by the search engine, (i) the data that identifies the native application, and (ii) the link to the viewed content, in association with the viewed content; and using the stored set of data in generating a search result that (i) references the viewed content, and (ii) includes the link to the viewed content that, when selected, launches the viewed content in the native application.

Other versions include corresponding systems, and computer programs, configured to perform the actions of the methods encoded on computer storage devices.

One or more implementations may include the following optional features. For example, in some implementations, the representation of viewed content includes keywords from the viewed content, or an identifier associated with the viewed content.

In some implementations, the representation of viewed content includes keywords from the viewed content, or an identifier associated with the viewed content.

In some implementations, the access control list specifies whether the viewed content is classified as private content or public content.

In some implementations, the link to the viewed content includes a deep link.

In some implementations, using the stored set of data in generating the search result includes: receiving, from a mobile device, a search query; identifying the viewed content as responsive to the search query; determining that the native application is installed on the mobile device; and in response to determining that the native application is installed on the mobile device, generating a search result that (i) references the viewed content, and (ii) includes the link to the viewed content that, when selected, launches the viewed content in the native application.

Particular implementations of the subject matter described in this specification may be implemented so as to realize one or more of the following advantages. For example, information stored in the application page index of native application pages may be taken from actual application page data, and may thus provide a more comprehensive description of application content than is provided by metadata that is external to the native application and that describes the native application. This, in turn, may provide a search engine with the ability to determine relevance measures that are more accurate than relevance measures based on the metadata describing the native application. In particular, the application page index of native application pages may provide a search engine with the capability of surfacing search results for native applications that take into account the actual data provided within the application pages of the native application. This may be potentially more accurate than relying solely on metadata that is descriptive of a native application, such as a title and description of the native application, and may also relieve content publishers of performing search engine optimizations on the metadata to ensure that the native applications are identified in response to particular queries.

Implementations in which application page data are accessed in binary form may reduce the likelihood of descriptive errors that may result when using techniques that derive such data, such as optical character recognition errors. In addition, accessing the data in binary form may also identify data that would otherwise be hidden from a viewport, such as in the case in which a scrollable element must be actuated to move the viewport within an application environment. That collection of application page data may use the native application as a source of the application page data, and thus collection of data describing the application may be accomplished in a more timely manner than by collecting metadata from multiple different websites. Likewise, the collection of application page data in this manner may be more scalable than collecting metadata from multiple different websites.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
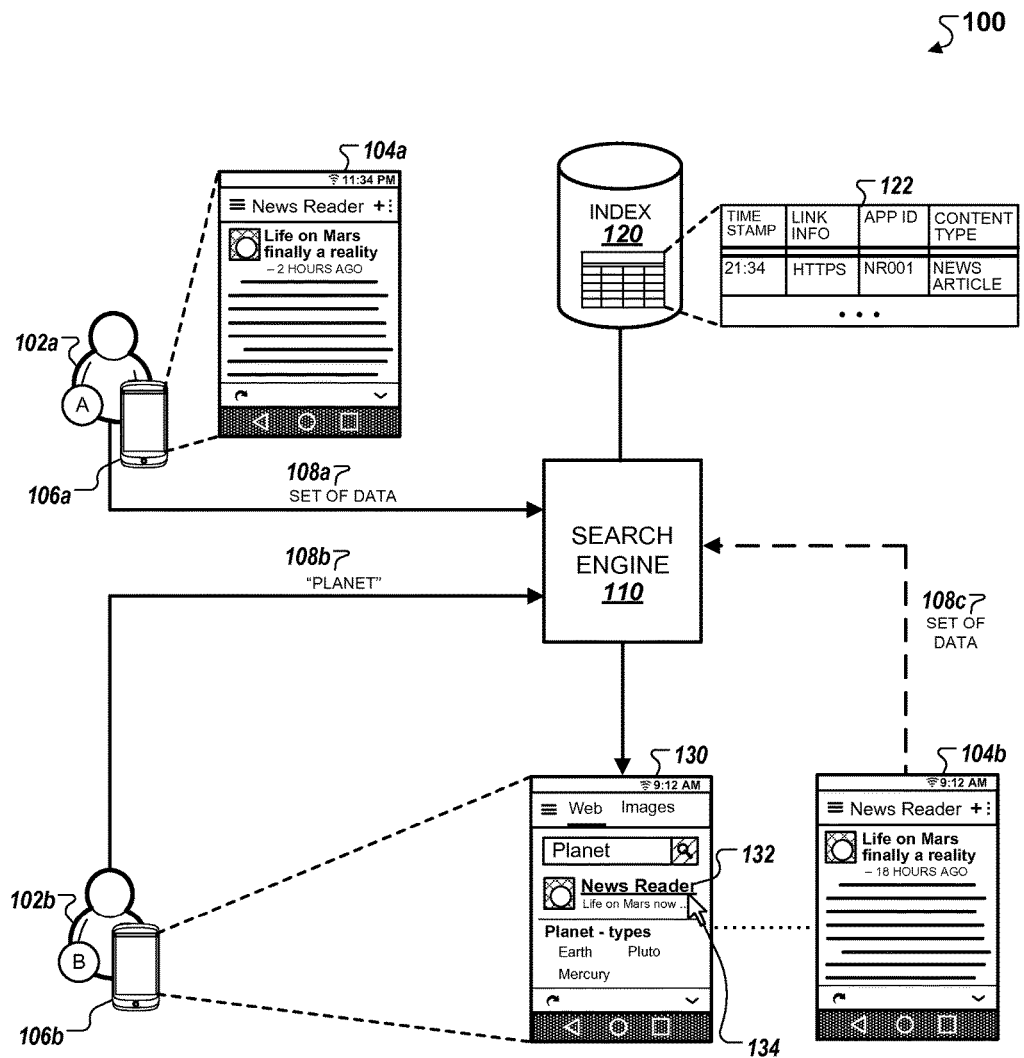
FIG. 1 illustrates an exemplary system that may be used for indexing native application data.

According to one general implementation, given that content consumption on native applications has significantly increased with the increase of available content on mobile devices, a search engine may access user activity data generated by these native applications. Specifically, in addition to user activity data such as previously submitted search queries, content accessed through web browsers, or user responses to presented search results, a search engine may access user activity data generated by native applications that operate independently of search engines. Such user activity data, when considered by search engines, allows search results to be generated to reflect significant portions of user activity on mobile devices, which improving search query performance.

Accordingly, techniques are described for making native application content available to a search engine for generating search results in response to a subsequent search query that is related to the native application content. In particular, the search engine may store a set of data associated with the native application content within an index, and in response to receiving a related search query, use the stored set of data to generate a set of search results that references the viewed content and provide a link to the viewed content that, when enabled, launches the native application.

As used herein, a native application may generate application pages for display on a mobile device within an environment of the native application, and may operate independently of a browser application on the mobile device. For example, a native application may be an application that is specifically designed to run on a particular mobile device operating system and machine firmware. Native applications thus differ from browser-based applications and browser-rendered resources. The latter may require all, or at least some, elements or instructions downloaded from a web server each time they are instantiated or rendered. In addition, browser-based applications and browser-rendered resources may be processed by all web-capable mobile devices within the browser and thus, are not operating system specific.

To index data for a native application, the system may instantiate a virtual machine that emulates an operating system operating on a mobile device. Within the virtual machine, the system may instantiate a native application that is specific to the operation system. For instance, the native application may generate application pages for display on a mobile device within the native application, and operate independently of a browser application on the mobile device.

The system may access, within the virtual machine, application pages of the native application. For instance, the system may access the pages using an automated process that explores various menus and selection options for each application page and each subsequent application page. Alternatively, the system may access particular application pages that are specified by a particular publisher of the native application.

For each of the application pages, the system may generate application page data describing content of the application page. The viewed content described by the application page data may include, for example, text that a mobile device displays on the application page when the mobile device displays the application page, image data that defines an image of the application page that would be rendered in the native application, listing/menu data that describes various lists and menus of the application page, or other data that describes other features of the application page.

The application pages for the native application may be indexed in an index that is searchable by a search engine. For instance, the search engine may combine web resource search results that reference web resources that may be rendered in a browser application on a mobile device, and native application search results that specify the native application. The native application search results may be generated, in part, in response to a search of index of the application pages for native applications.

Operation of the system that indexes application page data and the processing of search results for application pages is described in more detail below.

FIG. 1 illustrates an exemplary system 100 that may be used for indexing native application data. In general, a user 102a uses a native application 104a on a mobile device 106a to access content, which may be sent to a search engine 110 as a set of data 108a, and stored in an index 120. The search engine 110 may then receive a subsequent search query 108b from the mobile device 106b, and in response to the received search 108b, generate a search results page 130. Another user 102b may then provide a user input 134 on a link 132 included in the search results page 130, which then launches native application 104b on the mobile device 106b.

In more detail, the mobile devices 106a-106b may be any type of mobile computing devices that include mobile operating systems such as, for example, smartphones, tablet computers, or laptop computers. The native applications 104a-104b may be mobile applications that are installed on computer-readable storage mediums of the mobile devices 106a-106b, respectively, and configured to be executed on the operating systems of the mobile devices 106a-106b. For example, the native applications 104a-104b may be either be applications that are included within the operating systems of the mobile devices 106a-106b, e.g., an email application, a messaging application, or applications that are installed from an application store, e.g., a third-party news reader application. In some instances, the native applications 104a-104b may also be provided by content providers to enable the users 102a-102b to access the viewed content that is displayed by the native applications 104a-104b, respectively.

In some implementations, the native application 104a may extract data that includes representations of the viewed content that is accessed by the user 102a on the native application 104a. The representations of the viewed content may include keywords that are extracted from the viewed content, or a hyperlink that directs a user 102a to a display of the viewed content on the native application 104a. For example, in some instances, the keywords may be commonly occurring terms within the viewed content that may be used to identify the viewed content. In other instances, the hyperlink may be a deep link that transmits instructions to the mobile device 106a to execute the native application 104a to show the viewed content.

In some implementations, the set of data 108 may additionally include user information for the user 102a. The user information may include a hardware device identifier of the mobile device 106a, account information that is related to a user account or subscription to the native application 104a, or other types of information that enable the search engine 110 to associate the set of data 108 with the user 102a. For example, in some instances, demographic information related to the user 102a may be collected to aggregate data that is collected from particular types of content that are available over the native application 104a.

In some implementations, the set of data 108 may additionally include an access control list that specifies, for example, whether the viewed content that is accessed by the user 102a should be classified as private content or public content. For instance, the access control list may identify particular users and specify access rights allowed, denied, or audited for each user. For example, data that is classified as private may include identifying user information such as account logins and passwords, payment information, or other types of information the user 102a wishes to keep private. In other examples, data that is classified as public may include information that may be used to aggregate user activity data from multiple users that access particular content on the native application 104a. For instance, data that indicates the articles were read by the user 102a, or search queries that were provided by the user 102a on the native application 104a may be used to aggregate data from multiple users to determine user activity patterns related to the viewed content on the native application 104a.

As shown in the example in FIG. 1, the user 102a may view news-related content on the native application 104a, which may be a news reader application that provides the user 102a with news articles from digital publishes. As depicted, the user 102b may use the news reader application read an article with the title "Life on Mars finally a reality." The news reader application may gather the set of data 108a representing user activity on the native application 104a such as information related to the news articles that are accessed by the user 102a.

The search engine 110 may be a software system that includes a search infrastructure for receiving the set of data 108 related to content on the native application 104a and designed to search for information on the Internet based on the received set of data 108a and search query 108b. For instance, the search engine may be coupled to the search infrastructure through a network that is coupled with the mobile devices 106a-106b. The search engine 110 may be implemented in software, firmware, hardware, or any combination. For example, in some implementations, the search engine 110 may be integrated into a server that can communicate with or is part of a web server (not shown). In such implementations, the search engine 110 may search for information over the Internet through respective browsers running on remote client devices such as, for example, the mobile devices 102a and 102b.

The search engine 110 may access the received set of data 108a to extract information from set of data 108a and store the information within the index 120. For instance, the search engine 110 may use common search engine indexing techniques used by search engine architectures to generate the index 120. The extracted information within the index 120 may be stored in the viewed content information table 122.

As shown in the example in FIG. 1, the viewed content information table 122 may include information related to the viewed content accessed by the user 102a in the native application 104a. As depicted, the viewed content information table 122 includes, for example, a "TIMESTAMP," which indicates when the user 102a accessed the viewed content in the native application 104a, a "LINK INFO," which indicates the communication protocol used by the native application 104a to load the viewed content, a "APP ID," which represents a unique application identifier associated with the native application 104a, and a "CONTENT TYPE," which classifies the type of content represented on the native application 104a.

The search engine 110 may also receive search queries from users. For instance, as shown in the example in FIG. 1, the search engine 110 receives a search query 108b for the term "PLANET," which is sent from the user 102b using the mobile device 106b. In response to receiving the search query 108b, the search engine 110 may determine, based on comparing the terms included in the search query 108b to the information included in the index 120, information within the viewed content information table 122 that is relevant to the terms included in the search query 108b. For example, as depicted, the search engine 110 may determine that the viewed content represented on the native application 104a is relevant to the search query 108b "PLANET" because the viewed content information table 122 indicates that the title of the news article "Life on Mars finally a reality" includes the related term "MARS." The search engine 110 may then generate a search results page 130 on the mobile device 106b in response to receiving the search query 108b. For instance, the search results page 130 may be shown on a web browser on the mobile device 106b.

As shown in example in FIG. 1, the search results page 130 includes references to the viewed content in the native application 104a based on the search engine 110 determining that the search query 108 is related to the information included in the viewed content information table 122 of the index 120. The search results page 130 includes the link 132, which may be activated by the user input 134. For instance, the user input 134 may include, for example, a "one-click" using a mouse or a touch input over the text of the link 132. Once the link 132 is activated, the mobile device 106b launches the viewed content in the native application 104b.

In some implementations, the link 132 may be a deep link with embedded information that provides a set of computer-implemented instructions to the mobile device 106b to launch the native application 104b to depict content associated with information included in the viewed content information table 122.

In some implementations, the search engine 110 may perform additional or alternative operations related to the native application 104b in response to receiving the search query 108b. For instance, the search engine 110 may initially determine if the viewed content in the viewed content information table 112 is responsive to the search query 108b, and in response to determining that the viewed content is responsive to the search query 108b, generating the search results page 130. In such instances, the search engine 110 may only include the link 132 in the search results page 130 if the viewed content is determined to be responsive to the search query 108b. For example, if the search query 108b does not include terms that are related to the information within the viewed content information table 122, the search engine may ignore the set of data 108*a* within index 120 in generating the search results page 130.

As shown in the example in FIG. 1, the search results page 130 includes a hyperlink to the "News Reader" native application that shows the news article content with the title "Life on Mars finally a reality." After receiving a user input activating the hyperlink, the mobile device 106*b* may then launch the "News Reader" native application to show the news article "Life on Mars finally a reality." As depicted in the example, the system 100 may be used to associate a common news article content that may be of interest between the users 102*a* and 102*b*, based on the search engine 110 receiving data indicating that the users 102*a* and 102*b* may be interested in similar topics related to space.

In some implementations, after the user 102*b* activates the link 132, the mobile device 106*b* may then transmit a set of data 108*c* to the search engine 110, which may then update the viewed content information table 112 for the shared content between the native applications 104*a* and 104*b*. In such implementations, the search engine 110 may recursively generate the index 120 after subsequent users access the associate the viewed content to collect aggregated information of the viewed content based on content by multiple users.

In some instances, the native application 104*b* may be a different application from the native application 104*a* that displays the same content. In such instances, the viewed content may be provided by a content provider on different types of native applications that run on mobile devices. For example, the viewed content may be a news article that is published on multiple mobile platforms and accessed by various native applications.

In some instances where the native application 104*b* is not installed on the mobile device 106*b* when the user 102*b* activates the link 132, the system 100 may instead determine another compatible platform to display the associated content. For the example in FIG. 1, instead of the mobile device 106*b* running the native application 104*b*, the mobile device 106*b* may instead display the news article on a web browser application on the mobile device 106*b*.

Figure 2:
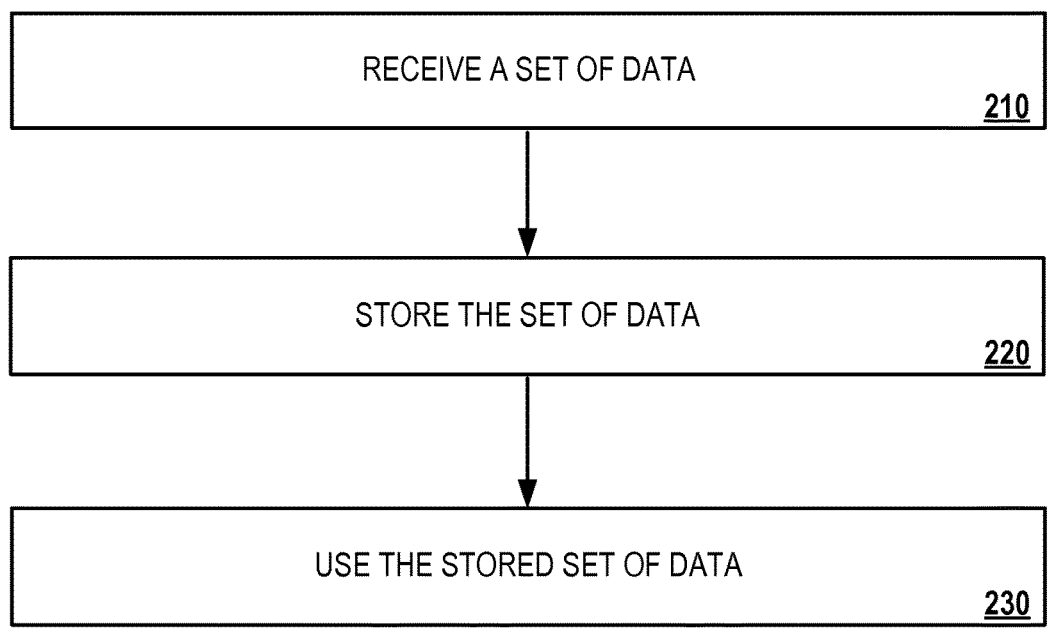
FIG. 2 illustrates exemplary process that may be used for indexing native application data.

FIG. 2 illustrates exemplary process 200 that may be used for indexing native application data. Briefly, the process 200 may include receiving a set of data (210), storing the set of data (220), and using the stored set of data (230).

In more detail, the process 200 may include receiving a set of data (210). For example, the search engine 110 may receive, from the mobile device 106*a*, a set of data 108*a* that is generated by the native application 104*a* on the mobile device 106*a*. The set of data 108*a* may include data that identifies the native application 104*a*, a representation of viewed content, and a link to the viewed content that, when selected, launches the viewed content in the native application 104*a*. For instance, as shown in FIG. 1, the viewed content may be news article that is displayed on the native application 104*a*, which may be a news reading application.

The process 200 may include storing the set of data (220). For example, the search engine 110 may store the data that identifies the native application 104*a*, and the link to the viewed content, in associated with the viewed content. For instance, as shown in FIG. 1, the index 120 may include the viewed content information table 122, which includes information from the received set of data 108*a*. For example, the information may include a timestamp represented when the user 102*a* accessed the viewed content, information related to the link to the viewed content, a native application identifier that identifies the native application 104*a*, or a classification of the viewed content.

The process 200 may include using the stored set of data (230). For example, the search engine 110 may use the stored set of data on the index 120 in generating a search results page 130 in response to a search query, for example, the search query 108*b* from the mobile device 108*b*. For instance, the search results page 130 may reference the viewed content, and may include the link 132 that, when selected, launches the viewed content in the native application 104*b*. The user may select the link 132 using the user input 134. In some instances, after the user input 134, the set of data 108*c* may be transmitted to the search engine 110, which then updates the index 120 after the mobile device 106*b* accesses the native application 104*b*.

Figure 3:
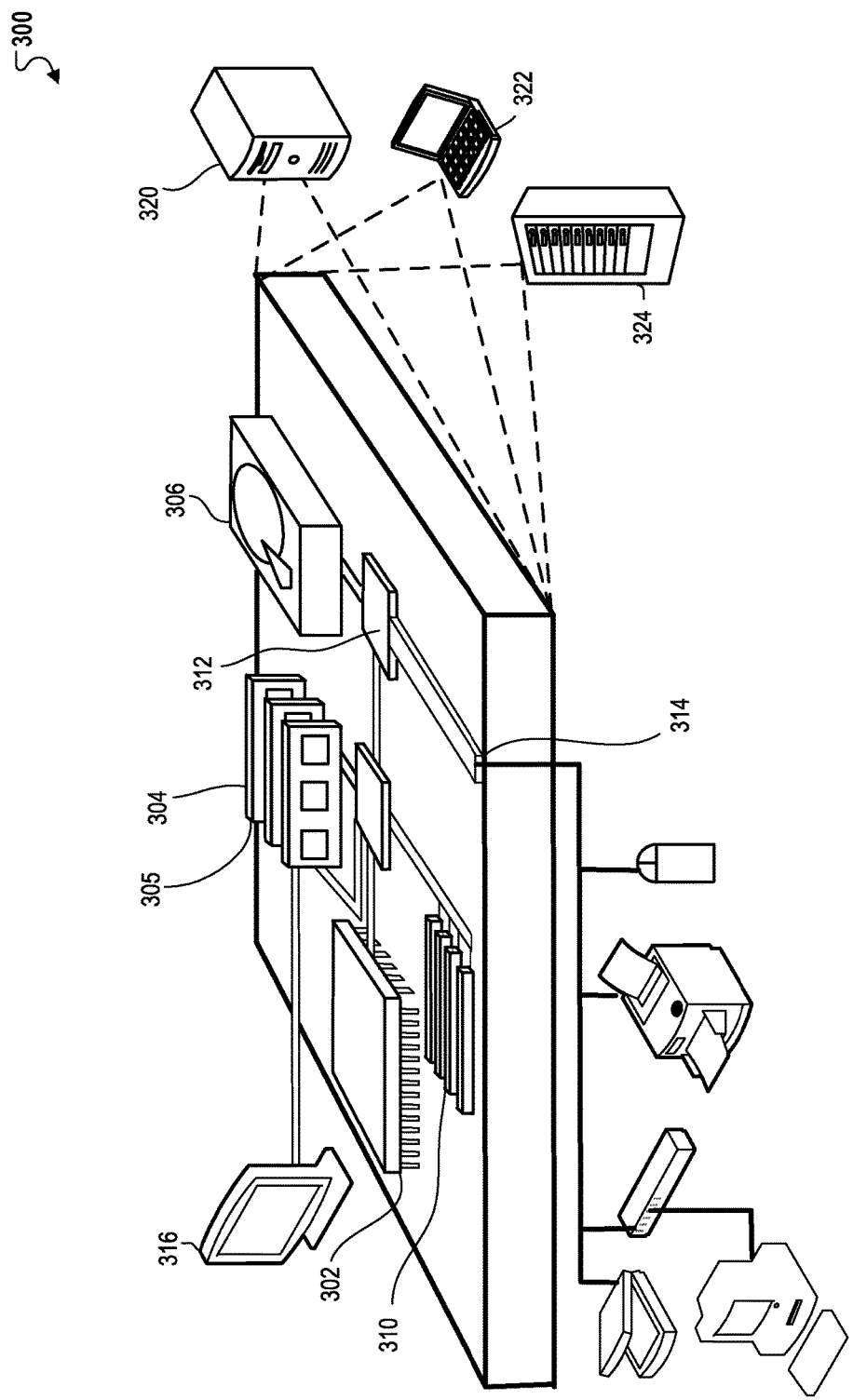
FIG. 3 is a block diagram of computing devices on which the processes described herein, or portions thereof, may be implemented.

FIG. 3 is a block diagram of computing devices 300 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown). Each of such devices may contain one or more of computing device 300 and an entire system may be made up of multiple computing devices 300 communicating with each other.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving, by a search engine and from a mobile device associated with a particular user and a particular native application, a set of data that is generated by the particular native application on the mobile device, the set of data including (i) data that identifies the particular native application, (ii) a representation of viewed content, the viewed content being content that was displayed by the particular native application on the user device and determined to be viewed by the particular user, and (iii) a link to the viewed content that, when selected, launches the viewed content in the particular native application;
   storing, by the search engine, (i) the data that identifies the particular native application, and (ii) the link to the viewed content, in association with the viewed content; and (iii) information identifying the particular user of the mobile device; and
   using the stored set of data in generating a search result that (i) references the viewed content, and (ii) includes the link to the viewed content that, when selected, launches the viewed content in the particular native application, the search result being generated in response to a query by the particular user.

2. The method of claim 1, wherein the representation of viewed content includes keywords from the viewed content, or an identifier associated with the viewed content.

3. The method of claim 1, wherein the set of data further includes (iv) an access control list that specifies whether the viewed content is classified as private content or public content.

4. The method of claim 1, wherein using the stored set of data in generating the search result comprises:
   receiving, from a mobile device, a search query from the mobile device of the particular user;
   identifying the viewed content as responsive to the search query;
   determining that the particular native application is installed on the mobile device; and
   in response to determining that the particular native application is installed on the mobile device, generating a search result that (i) references the viewed content, and (ii) includes the link to the viewed content that, when selected, launches the viewed content in the particular native application.

5. A system comprising:
   one or more computers; and
   a non-transitory computer-readable medium coupled to the one or more computers having instructions stored thereon, which, when executed by the one or more computers, cause the one or more computers to perform operations comprising:
   receiving, by a search engine and from a mobile device associated with a particular user and a particular native application, a set of data that is generated by the particular native application on the mobile device, the set of data including (i) data that identifies the particular native application, (ii) a representation of viewed content, the viewed content being content that was displayed by the particular native application on the user device and determined to be viewed by the particular user, and (iii) a link to the viewed content that, when selected, launches the viewed content in the particular native application;
   storing, by the search engine, (i) the data that identifies the particular native application, and (ii) the link to the viewed content, in association with the viewed content; and (iii) information identifying the particular user of the mobile device; and
   using the stored set of data in generating a search result that (i) references the viewed content, and (ii) includes the link to the viewed content that, when selected, launches the viewed content in the particular native application, the search result being generated in response to a query by the particular user.

6. The system of claim 5, wherein the representation of viewed content includes keywords from the viewed content, or an identifier associated with the viewed content.

7. The system of claim 5, wherein the set of data further includes (iv) an access control list that specifies whether the viewed content is classified as private content or public content.

8. The system of claim 5, wherein using the stored set of data in generating the search result comprises:
   receiving, from a mobile device, a search query;
   identifying the viewed content as responsive to the search query;
   determining that the native application is installed on the mobile device; and
   in response to determining that the native application is installed on the mobile device, generating a search result that (i) references the viewed content, and (ii) includes the link to the viewed content that, when selected, launches the viewed content in the native application.

* * * * *

UNITED STATES PATENT AND TRADEMARK OFFICE
CERTIFICATE OF CORRECTION

PATENT NO. : 10,120,949 B2  
APPLICATION NO. : 14/926253  
DATED : November 6, 2018  
INVENTOR(S) : Piyush Nigam Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 383 days.

Signed and Sealed this  
Fourteenth Day of May, 2019

Andrei Iancu  
*Director of the United States Patent and Trademark Office*